United States Patent

Davidson

[15] 3,654,939
[45] Apr. 11, 1972

[54] PIVOTAL CONNECTION FOR PLASTIC PRODUCT

[72] Inventor: Emil Davidson, Scarsdale, N.Y.
[73] Assignee: Guild Molders, Inc., Elmsford, N.Y.
[22] Filed: Sept. 14, 1970
[21] Appl. No.: 71,913

[52] U.S. Cl. .........................................................132/88.7
[51] Int. Cl. ......................................................A45d 40/26
[58] Field of Search ..................132/88.7, 1, 53, 56, 32 C, 132/31

[56] References Cited

UNITED STATES PATENTS

| | | | |
|---|---|---|---|
| 2,268,082 | 12/1941 | Phillips, Sr. | 132/53 |
| 3,478,754 | 11/1969 | Martin, Jr. | 132/1 R |
| 2,168,370 | 8/1939 | Solomon | 132/32 C |
| 3,511,248 | 5/1970 | Pandu | 132/1 R |

*Primary Examiner*—Louis G. Mancene
*Assistant Examiner*—Gregory E. McNeill
*Attorney*—Amster & Rothstein

[57] ABSTRACT

A pivotal connection for a plastic product which includes two members wherein one of the members is provided with opposed seating parts forming a pivot seat which seating parts are in flexible walls and the other of the members is formed with opposed pivot pins and camming means such that the camming means will be effective to flex and spread the walls of the one member to thereby enable the pivot pins to enter the respective seating parts to hingedly interconnect the two members. In a typical application, the two members may be constructed to form an eyelash applicator.

12 Claims, 8 Drawing Figures

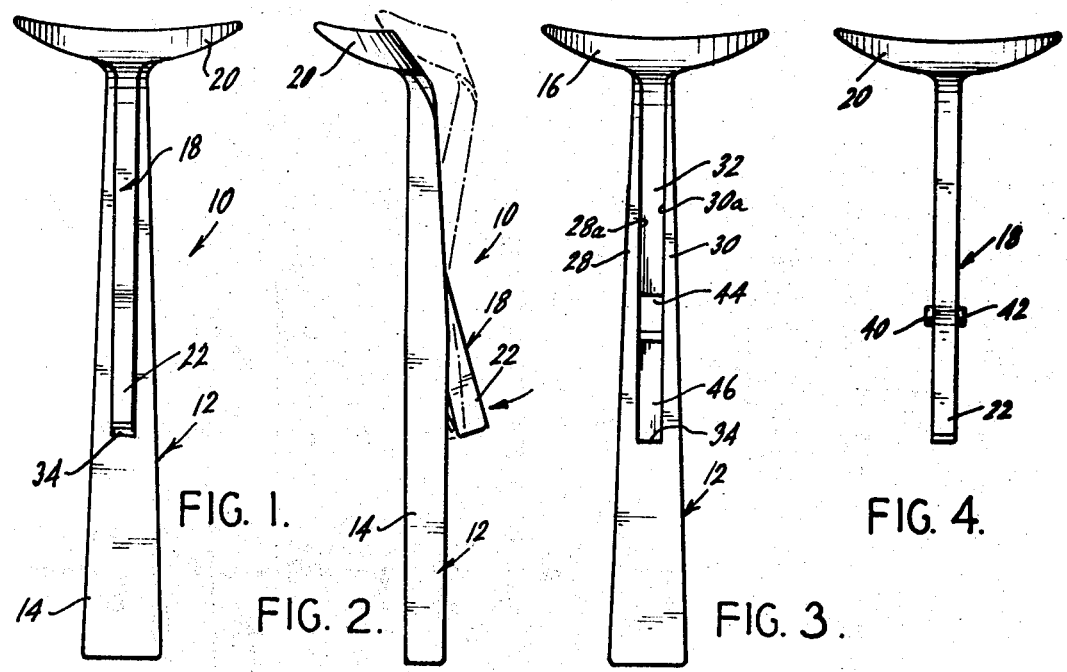
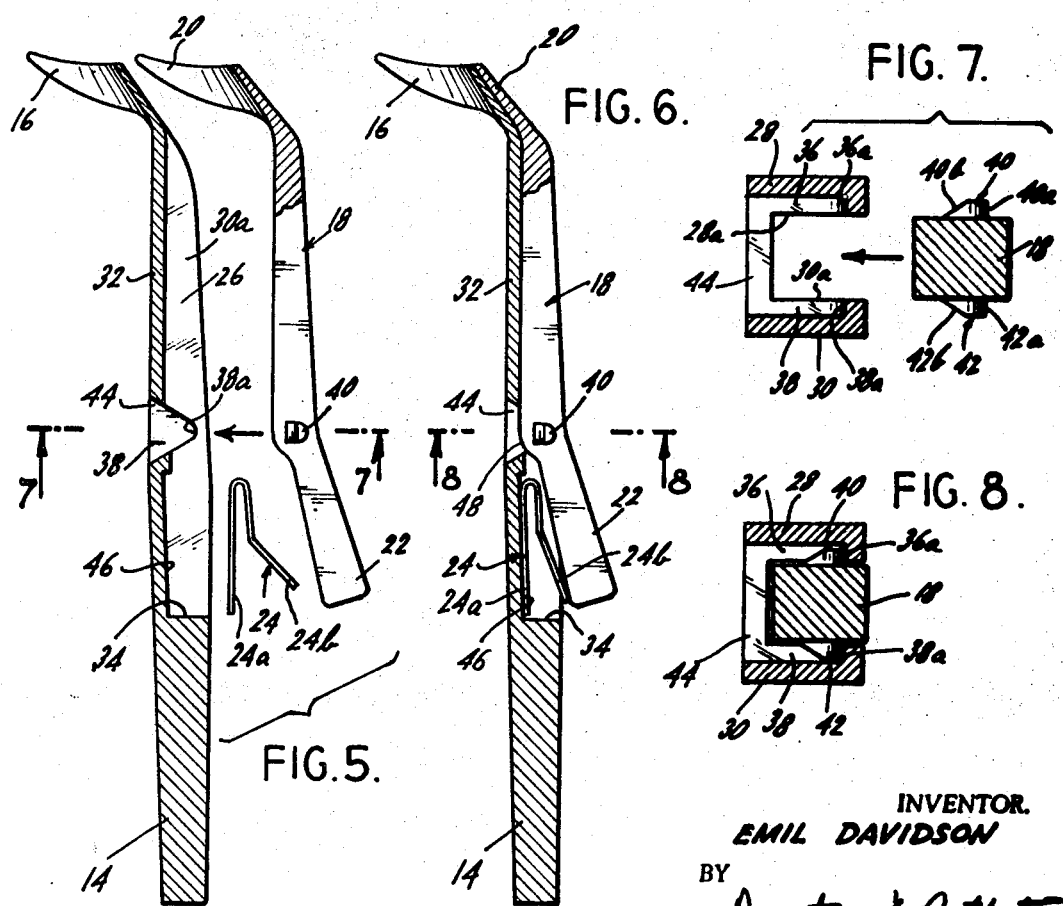

PIVOTAL CONNECTION FOR PLASTIC PRODUCT

THE INVENTION

The present invention relates generally to a pivotal connection for a plastic product and, in particular, to an improved eyelash applicator or similar plastic product having two pivotally interconnected members.

There are numerous plastic products which include two members which are pivotally interconnected at one or more pivotal connections including, for example, an eyelash applicator in which the members are elongated handle parts and terminate in coacting lash-engaging jaws. In the mass production manufacture of such products, it is highly desirable to provide a construction wherein the members may be pivotally interconnected by snapping the two members together, with the integral molding of a pivot seat on one of the members and a pivot pin on the other of the members. Further, from the manufacturing standpoint, it is preferable to employ a construction which does not require the utilization of cam-action molds since the utilization of such molds introduces complexity in the mold and a corresponding increase in unit cost.

Broadly, it is an object of the present invention to provide an improved pivotal connection for pivotally or hingedly interconnecting two members. Specifically, it is within the contemplation of the present invention to provide a pivot connection on two members which are to be hingedly interconnected which pivot connection includes integrally molded pivot seats and pins which are formed without the utilization of cam-action molds and wherein the pivotal connection is established by the simple expedient of snapping together the two members to thereby seat the pivot pin on one of the members in the pivot seat on the other of the members.

In accordance with an illustrative embodiment demonstrating objects and features of the present invention, there is provided a plastic product which includes two members which are connected to at least one pivotal connection. The pivotal connection is established by providing on one of the members spaced and flexible walls having opposed seating parts forming a pivot seat, with the walls of the one member being spaced apart to receive a portion of the other of the members therebetween. The portion of the other of the members includes oppositely directed pins forming a pivot which is adapted to be engaged in the pivot seat on the one member. Each of the pins includes a camming part and a pivot part, with the spacing of the walls being such that the camming parts will spread the walls incident to the insertion of the portion of the other member between said walls such that the pivot will enter the pivot seat and cooperate therewith in providing the required pivotal connection.

In a typical product, such as an eyelash applicator, there is provided a first member which terminates forwardly in a first lash-engaging jaw and a second member also terminating forwardly in a second lash-engaging jaw and having a rearwardly directed finger piece for manipulating the applicator. The first member is molded with a guideway having parallel side walls terminating in upper edges and a base which interconnects the lower edges of the side walls. The guideway is dimensioned to receive a portion of the second member. The first member has a molded opening through the base which provides opposed pivot seats in the side walls which terminate short of the upper edges thereof. The second member is integrally molded with oppositely directed and aligned pivot pins which are adapted to be received respectively in the opposed pivot seat. Means are provided on the second member which are operable in response to insertion of the portion of the second member in the guideway formed in the first member to spread the side walls thereof such that the pivot pins may be engaged within the corresponding pivot seats to pivotally interconnect the first and second members. Advantageously, the two members may be assembled with each other, with or without the provision of a spring to bias the lash-engaging jaws to a closed position relative to each other, by simply snapping the two members together.

The above brief description, as well as further objects, features and advantages of the present invention will be more fully appreciated by reference to the following detailed description of a presently preferred, but nonetheless illustrative eyelash applicator incorporating the improved pivotal interconnection of the present invention, when taken in conjunction with the accompanying drawings, wherein:

FIG. 1 is a plan view of an improved eyelash applicator embodying features of the present invention;

FIG. 2 is a side elevational view of the eyelash applicator shown in FIG. 1, as viewed from the left thereof, the dotted line showing the open position of one lash-engaging jaw relative to the other;

FIG. 3 is a plan view corresponding to FIG. 1, but showing only one member of the eyelash applicator;

FIG. 4 is a plan view showing the other member of the eyelash applicator;

FIG. 5 is an exploded sectional view of the two members of the eyelash applicator in position for assembly with each other with the spring of the applicator in position to be seated within the spring seat formed in the one member;

FIG. 6 is a sectional view similar to FIG. 5, but showing the two members as assembled with the spring seated and biasing the lash-engaging jaws into the closed position relative to each other;

FIG. 7 is a sectional view on an enlarged scale taken substantially along the line 7—7 of FIG. 5 and looking in the direction of the arrows showing the details of the means providing the pivotal connection between the two members of the eyelash applicator in position for assembly; and FIG. 8 is a sectional view taken substantially along the line 8—8 of FIG. 6 and looking in the direction of the arrows showing the parts in assembled condition and providing the pivotal interconnection between the two members of the eyelash applicator.

Referring now specifically to the drawings, there is shown an improved eyelash applicator embodying features of the present invention, generally designated by the reference numeral 10. Although the invention will be described in conjunction with this particular plastic product, it will be appreciated by those skilled in the art that the pivotal interconnection in this product has useful application in a wide range of plastic products wherein it is necessary to establish one or more pivotal or hinged connections between the plastic members in a simple and easily manufactured part design and corresponding mold construction.

The eyelash applicator 10 includes a first member 12 (see FIGS. 1 and 3) which includes an elongated handle 14 which tapers forwardly and terminates at its forward end in a first lash-engaging jaw 16. The eyelash applicator further includes a second elongated member 18 terminating forwardly in a second lash-engaging jaw 20 and having a rearwardly directing finger piece 22 for manipulating the applicator 10. Preferably, but not essential to the eyelash applicator 10, is a spring 24 (see FIGS. 5 and 6) which is seated on the member 14 and engages the finger piece 22 to bias the lash-engaging jaw 20 into a closed position relative to the lash-engaging jaw 16, as seen best in FIG. 6.

The requisite pivotal interconnection between members 14 and 18 is established by molding techniques which do not necessitate the employment of cam-action molds in that the molded and interfitted members 14, 18 include substantially parallel walls and include no undercuts which would otherwise require cam-action parts in the mold. Specifically, member 14 which serves as the elongated handle is formed with a longitudinally extending guideway 26 which includes opposed side walls 28, 30 which have parallel inner faces 28a, 30a. Along their lower edges, the side walls 28, 30 are interconnected by a base wall 32, with the upper side edges defining an open mouth through which the member 18 may be assembled, as will be subsequently described. At its rearward end, guideway 26 is closed at 34; and at its forward end, guideway 26 is opened such that member 18 may be moved to bring the jaw 20 from the closed position relative to jaw 16 (as shown by the full lines in FIG. 2) to the open position (as shown by the dotted lines in FIG. 2) by pressing on the finger piece 22, as indicated by the directional arrow in FIG. 2.

Opposed pivot parts or pivot seats 36, 38 are formed on the inner side faces 28a, 30a of the side walls 28, 30 of member 14 which are adapted to receive oppositely directed and aligned pivot pins 40, 42 projecting from the opposite sides of the member 18. In accordance with the present invention, the seating parts or pivot seats 36, 38 are formed by molding through base wall 32 and provide respective open ended undercuts in the otherwise parallel inner side faces 28a, 30a of side walls 28, 30. The seating part or pivot seats 36, 38 are substantially V-shaped and each terminate at a curved apex 36a, 38a, short of the corresponding upper edges of the side walls and the open mouth of the guideway 26. The curved apices 36a, 38a are of curvatures corresponding to that of the bearing sections 40a, 42a of the oppositely directed pins 40, 42. As is generally understood in accordance with known molding techniques, the mold for member 12 can be designed with a parting line which extends longitudinally of and in a mid plane in relation to member 14, with the guideway 26 being molded by projections on one mold part and the seating parts or pivot seats 36, 38 and the opening 44 therebetween by a corresponding projection on the other mold part.

As seen best in FIG. 7, the width of member 18 is such that it will fit snugly within guideway 26 (see FIG. 8) and the transverse extent of the pins 40, 42 are such that they will be journalled or seated respectively in the seating parts 36, 38 at the curve apices 36a, 38a.

Means are provided on the member 18 which are operable in response to insertion of the intermediate portion thereof within guideway 26 to spread side walls 28, 30 such that the pins 40, 42 may be engaged within the corresponding pivot seats 36, 38 to pivotally interconnect the first and second members 12, 18. In the simplest form, this means include the provision on the leading side of each of the pins 40, 42 of a camming part or section 40b, 42b which camming part or sections engage the side walls 28, 30 at the open mouth of guideway 26 and spreads the side walls 28, 30 outwardly such that the pivot pins will enter the pivot seats with a snap action and assume the assembled position shown in FIG. 8. The depth of guideway 26 is selected in relation to the corresponding dimension of member 18 and the location of the pins 40, 42 such that the curve bearing parts or sections 40a, 42a will be engaged with the corresponding curve parts 36a, 38a of the pivot seats 36, 38.

Preliminary to the assembly of members 12, 18, hair spring 24 is appropriately positioned for its biasing function. To this end, member 12 rearwardly of the pivot seats 36, 38 is provided with a spring seat 46 which is of a length and width to accommodate straight leg 24a of spring 24, with outwardly bent leg 24b being positioned to underlie finger piece 22 in the final assembly.

A typical assembly sequence will now be described:

Utilizing any appropriate jig or fixture, member 12 is supported and spring 24 is placed within spring seat 46. Member 18 is then brought to the substantially aligned position illustrated in FIG. 5 and upon being pressed forwardly in the direction indicated by the directional arrows of FIG. 5 (see also FIG. 7), the leading camming parts or sections 40b, 42b of pins 40, 42 engage the side walls 28, 30 of guideway 26, spreading the walls and allowing the pins to enter the seating parts 36, 38. When so assembled, spring 24 urges the lash-engaging jaw 20 against the lash-engaging jaw 16 and also biases the pivot parts 40a, 42a against their curved seats. In this illustrative embodiment, the portion of member 18 immediately beneath the pivot pins 40, 42 is formed into a somewhat curved nose 48 which is aligned with the opening 44 in base wall 32 intermediate pivot seats 36, 38 to aid in guiding and stabilizing the pivotal interconnection between members 12, 18. When so assembled, the eyelash applicator 10 may be used in the manner generally understood by simply grasping handle 14 and manipulating finger piece 22 to open and close the lash-engaging jaws 16, 20.

Although the invention has been described in conjunction with this specific product, it will be appreciated by those skilled in the art that the technique for establishing the pivotal connection between the two molded plastic members may be utilized for a wide variety of other purposes. For example, in the hinging together of the base and top of a box, a plurality of these hinge interconnections may be provided along an edge of the base and the top hingedly interconnecting the two parts.

A latitude of modification, change and substitution is intended in the foregoing disclosure, and in some instances some features of the invention will be used without a corresponding use of other features. Accordingly, it is appropriate that the appended claims be construed broadly and in a manner consistent with the spirit and scope of the present invention.

What I claim is:

1. In a plastic product including two members which are to be connected at least one pivotal connection, the improvement comprising one of said members including spaced and flexible walls having opposed seating parts of a pivot seat formed thereon, said walls of said one member being spaced apart to receive a portion of said other member therebetween, said portion of said other member including oppositely directed pins of a pivot adapted to be seated respectively in said seating parts of said pivot seat, each of said pins including a camming part and a pivot part, the spacing of said walls being such that said camming parts will spread said walls incident to the insertion of said portion of said other member between said walls such that said pivot parts of said pivot will enter into said seating parts of said pivot seat and cooperate therewith to provide said pivotal connection.

2. In a plastic product according to claim 1, said walls including substantially parallel inner faces and being interconnected by a base wall to define a guideway having an open mouth and receiving said portion of said other member.

3. In a plastic product according to claim 2, said seating parts being formed by respective cutout portions in said inner faces of said walls, said cutout portions opening through said base wall and terminating short of said open mouth of said guideway.

4. In a plastic product according to claim 3, said portion of said other member being dimensioned in relation to the width of said guideway to be received therein through said open mouth and the depth of said guideway being such as to enable said portion to be inserted to a point wherein said oppositely directed pins will drop into said seating parts whereupon said walls are disengaged from said camming parts and are restored to substantial parallelism.

5. An eyelash applicator comprising a first member terminating forwardly in a first lash-engaging jaw, a second member terminating forwardly in a second lash-engaging jaw and having a rearwardly directed finger piece for manipulating said applicator, said first member being molded with a guideway having parallel side walls terminating in upper edges and a base interconnecting the lower edges of said side walls, said guideway being dimensioned to receive a portion of said second member, said first member having a molded opening through said base providing opposed pivot seats in said side walls which terminate short of the upper edges thereof, oppositely directed pivot pins on said portion of said second member and adapted to be received respectively in said opposed seats and means on said second member operable in response to insertion of said portion in said guideway to spread said side walls such that said pivot pins may be engaged within their corresponding pivot seats to pivotally interconnect said first and second members.

6. An eyelash applicator according to claim 5 wherein the means on said second member include oppositely directed camming parts molded in said portion thereof.

7. An eyelash applicator according to claim 6 wherein said oppositely directed camming parts are formed in the leading sides of said pivot pins respectively.

8. An eyelash applicator according to claim 5 including a spring for biasing said first and second lash-engaging jaws into a closed position with respect to each other.

9. An eyelash applicator according to claim 8 wherein said first member includes a spring seat molded therein rearwardly of said opposed pivot seats, said spring seat receiving said spring prior to pivotally interconnecting said first and second members, said spring being arranged to engage the underside of said finger piece to thereby urge said second lash-engaging jaw into said closed position relative to said first lash-engaging jaw.

10. An eyelash applicator comprising a first member including a first lash-engaging jaw, a second member including a second lash-engaging jaw, said first member being molded with a guideway having parallel side walls terminating in upper edges and a base interconnecting the lower edges of said side walls, said guideway being dimensioned to receive a portion of said second member, said first member having a molded opening through said base providing opposed pivot seats in said side walls which terminate short of the upper edges thereof, oppositely directed pivot pins on said portion of said second member and adapted to be received respectively in said opposed seats and means on said second member operable in response to insertion of said portion in said guideway to spread said side walls such that said pivot pins may be engaged within their corresponding pivot seats to pivotally interconnect said first and second members.

11. An eyelash applicator according to claim 10 wherein said oppositely directed camming parts are formed in the leading sides of said pivot pins respectively.

12. An eyelash applicator according to claim 11 including a spring for biasing said first and second lash-engaging jaws into a closed position with respect to each other.

* * * * *